UNITED STATES PATENT OFFICE.

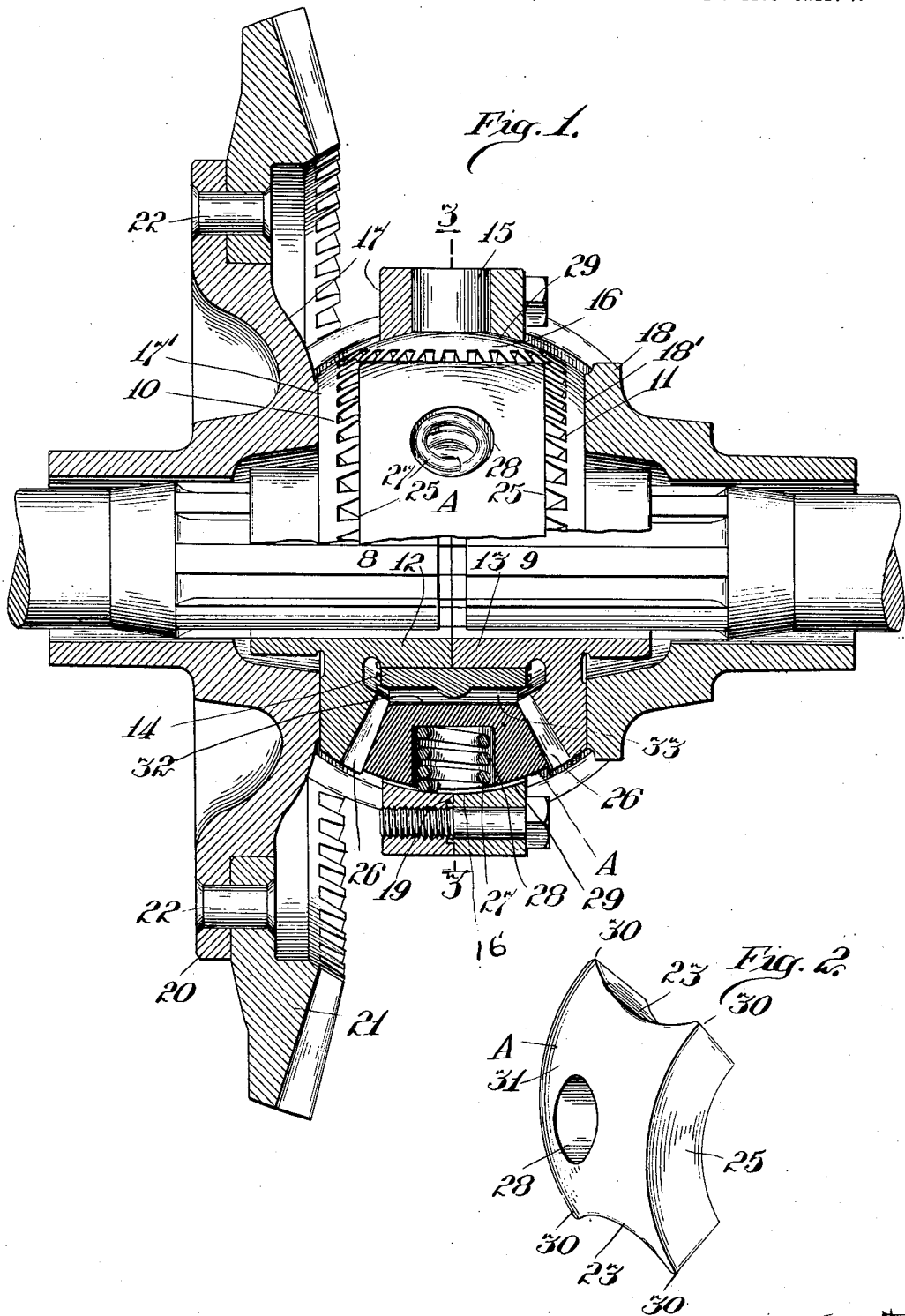

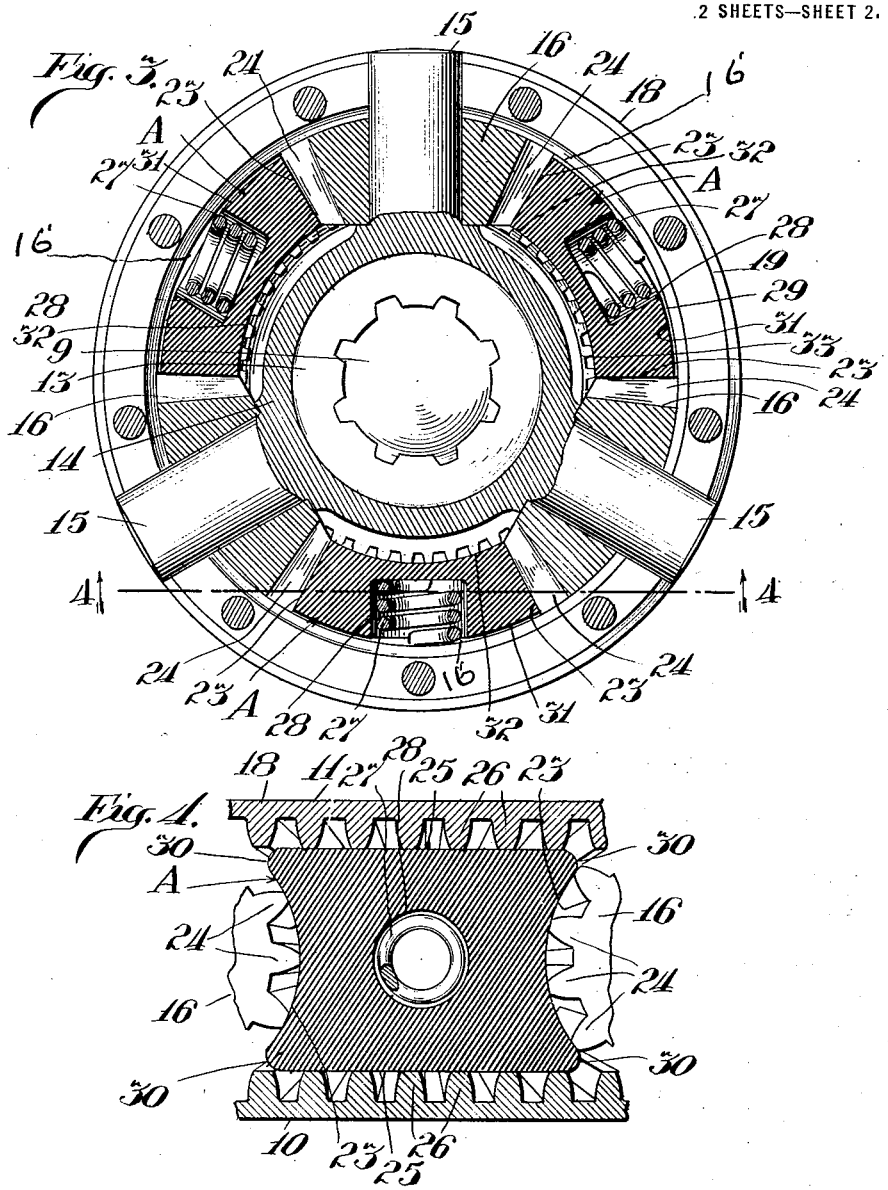

CLARENCE W. TAYLOR, OF CHICAGO, ILLINOIS, ASSIGNOR TO ONLAKE COMPANY, OF CHICAGO, ILLINOIS, A CORPORATION OF ILLINOIS.

BRAKE DEVICE FOR DIFFERENTIALS.

1,324,857.         Specification of Letters Patent.     Patented Dec. 16, 1919.

Application filed December 6, 1918. Serial No. 265,485.

*To all whom it may concern:*

Be it known that I, CLARENCE W. TAYLOR, a citizen of the United States of America, residing at Chicago, in the county of Cook and State of Illinois, have invented certain new and useful Improvements in Brake Devices for Differentials, of which the following is a specification.

My invention relates to improvements in brake devices for differentials, particularly to improvement in connection with the construction disclosed in my pending application, Serial #232,694, filed May 6, 1918, and the principal objects of my present invention are, First, to provide a one piece brake device positioned for constantly acting frictionally against two consecutive planetary pinions and the two opposed draft gears of a differential or any two of them by the radial thrust of the brake device effected by a pocketed spring reacting between the brake block and the planetary pinion casing or rotatable housing; and Second, to afford a construction whereby wear of the friction faces of the brake block and the parts with which it is in frictional relation is automatically taken up by said pocketed spring.

A practical embodiment of the invention is illustrated in the accompanying drawings which are a part hereof and in which similar characters of reference indicate the corresponding parts in all views.

The invention consists in the novel features and parts and in the novel combination and arrangement of the same, which will be more fully described hereinafter and then pointed out in the claims.

In the drawings,

Figure 1 is a longitudinal central section of the rear axle of an automobile, including the rotatable housing, with parts in elevation.

Fig. 2 is a perspective view of a one-piece brake device.

Fig. 3 is a cross sectional view on line 3—3 on Fig. 1.

Fig. 4 is a sectional view on line 4—4 on Fig. 3, looking in the direction indicated by the arrow.

On reference to the drawings herein of the embodiment chosen to exemplify my invention, the numerals 8 and 9, designate the adjacent ends of a divided shaft on which are fixed draft gears 10 and 11, having inwardly extending hubs, 12 and 13. Disposed between the gears 10, 11, is what I term a spider 14, having radially projecting trunnions 15. On each of said trunnions is loosely mounted a planetary pinion 16, which is constantly in mesh with both of the gears 10, 11. The transmission train comprises the pair of draft members 10, 11, between which power is transmitted, and the power transmitting train members 16, by which they are connected, the latter being disposed in a circular series about the axis of the connected shafts 8, 9.

The rotatable housing comprises a left part 17, and a right part 18, which are recessed in their inner meeting edges at 19, to receive and carry the end portions of the trunnions 15, for power transmission from the rotatable housing to the shafts 8, 9. The part 17 of the rotatable housing is formed with an external annular flange 20, has secured thereto ring gear 21 by rivets 22, the ring gear being in mesh with power transmission means from the motor (not shown), all in the well known form and manner, particularly when bevel gear type of differential is employed. It will be understood I do not limit my invention to the use of any type of differential mechanism.

The part 17, of the housing and the contiguous face 17' of the gear 10 have a "running fit." So also the part 18 of the housing and the contiguous face 18' of the gear 11 have a running fit.

For the purpose, among other things, of affording what is termed "drive wheels velocity-equalizers," to sufficiently oppose the "too efficient" action of the conventional differential, I have provided a one-piece brake block A, formed and positioned in intervals 16' between the members of the circular series of the transmission train members 16, for acting simultaneously and frictionally against four gears or any two of them in the transmission, that is, against two consecutive planetary pinions 16 and the two opposed gears.

As herein shown, the brake block A is somewhat wedge-shaped. The ends 23 are arcuate and formed for brake action with the contiguous planetary pinions, which, in the type shown, are frusto-conical. The ends 23 are adapted to be in uniform frictional contact with the teeth 24 of said frusto-conical pinions 16. The side walls 25 of the brake block A are tapered inwardly at an angle suitable to bear uniformly against the teeth 26 of the gears 10, 11.

The radial thrust of the solid brake block A is effected by a pocketed radially acting spring 27, which is seated at one end in the recess or pocket 28. At the other end the spring bears against the inner wall 29 of the assembled housing, and constantly urges the brake-block inwardly and between the brake-block A and the planetary pinion casing or rotatable housing, producing a four-way acting pressure of the spring device.

One brake-device interposed in an interval 16 between two consecutive planetary pinions may be used for light work, but preferably more than one brake device is employed interposed in the interval 16' between the members of said series of planetary gears whereby the brake devices alternate in said circle with said transmission members.

The corners 30 of the brake block A are rounded to avoid interference with teeth of the pinions 16 or the gears 10, 11. The outer surface 21 of the block A is convex and the inner face 32 is concave. Between the concave face 32 and the spider body 14, there is a clearance space 33 to allow for inward radial movement of said block which may be made necessary by wear of the frictional surfaces in operation.

The degree of compression afforded by the resilient element 27 should be sufficient to cause the divided shaft construction to operate substantially as a solid rear axle at all times excepting when deviation of the vehicle from a straight ahead path renders necessary some degree of differentiation, which takes place because the forces acting at the periphery of the road wheels are greater than the frictional resistance at the adjacent ends of the divided shaft to oppose relative rotative movement of the draft gears.

The radially-acting spring 27 produces the four-way acting pressure of the spring device.

It will be observed the brake device is simple in construction and may be incorporated with the differential without change or modification of such differential or any of its coöperative parts.

In construction and operation, one or more brake-devices are mounted as hereinbefore set forth. Power is imparted to the rotatable housing and through the housing to the spider or driver, as it is termed, for movement of the automobile in either direction. The frictional resistance exerted by the brake-devices, which are adapted for bearing not only against the planetary pinions but also against the two draft gears, for brake action simultaneously upon all four of the parts thus contacted prevents "spinning" of either road wheel when "in the air" or on a slippery or soft spot in the road surface.

The transmission train of gears comprises a pair of draft gears and a circular series of pinions interposed between them.

Having thus fully described my invention, what I claim as new, and desire to secure by Letters-Patent, is—

1. In a differential transmission device, the combination with the draft members between which power is transmitted, the power transmitting train members by which the draft members are connected and a rotatable housing, of a brake-device comprising a one-piece brake block interposed in an interval between two consecutive members of said power transmitting train for acting simultaneously frictionally against all four of said gears, and a radially acting resilient member positioned to react between the brake block and the rotatable housing for radial thrust of the brake block.

2. In a differential transmission device, the combination with the draft members between which power is transmitted, the circular series of power transmitting train members by which the draft members are connected and a rotatable housing, of a plurality of brake-devices each comprising a one-piece brake block interposed in an interval between two members of said circular series of power transmission members whereby the brake devices alternate in the circle with said transmission members and radially acting resilient members positioned to react between the brake blocks and the rotatable housing for radial thrust of the brake blocks.

3. In a differential transmission device, the combination with the divided shaft, the draft members between which power is transmitted, the circular series of power transmitting train members by which the draft members are connected and a rotatable housing, of brake devices each comprising a one-piece brake block interposed in an interval between two members of said circular series of power transmitting train members whereby the brake devices alternate in the circle with said transmission members for acting frictionally against all four of said gears and resilient means positioned to react between the brake blocks and the rotatable housing for radial thrust of the brake blocks.

4. In a differential transmission device, the combination with the divided shaft, the draft members between which power is transmitted, the circular series of power transmitting members by which draft members are connected, a spider carrying said circular series of power transmitting members, a rotatable housing and means to impart power to the rotatable housing, of a plurality of brake devices each comprising a one-piece brake block interposed between said draft members and in an interval between two members of said circular series of power transmitting train members whereby the brake devices alternate in the circle with said transmission members, and a compression spring positioned to react between the brake blocks and the rotatable housing for radial thrust of the brake blocks.

5. In a differential transmission device, the combination with the rotatable housing and the power transmitting train members carried by the rotatable housing, of a plurality of brake-devices each comprising a one-piece brake block interposed in an interval between two of said power transmitting train members whereby the brake-devices alternate with said power transmitting train members and radially acting resilient members positioned to react between the brake blocks and the rotatable housing for radial thrust of the brake blocks for simultaneously bearing against two members of said power transmitting train members.

In testimony whereof I affix my signature.

CLARENCE W. TAYLOR.